UNITED STATES PATENT OFFICE.

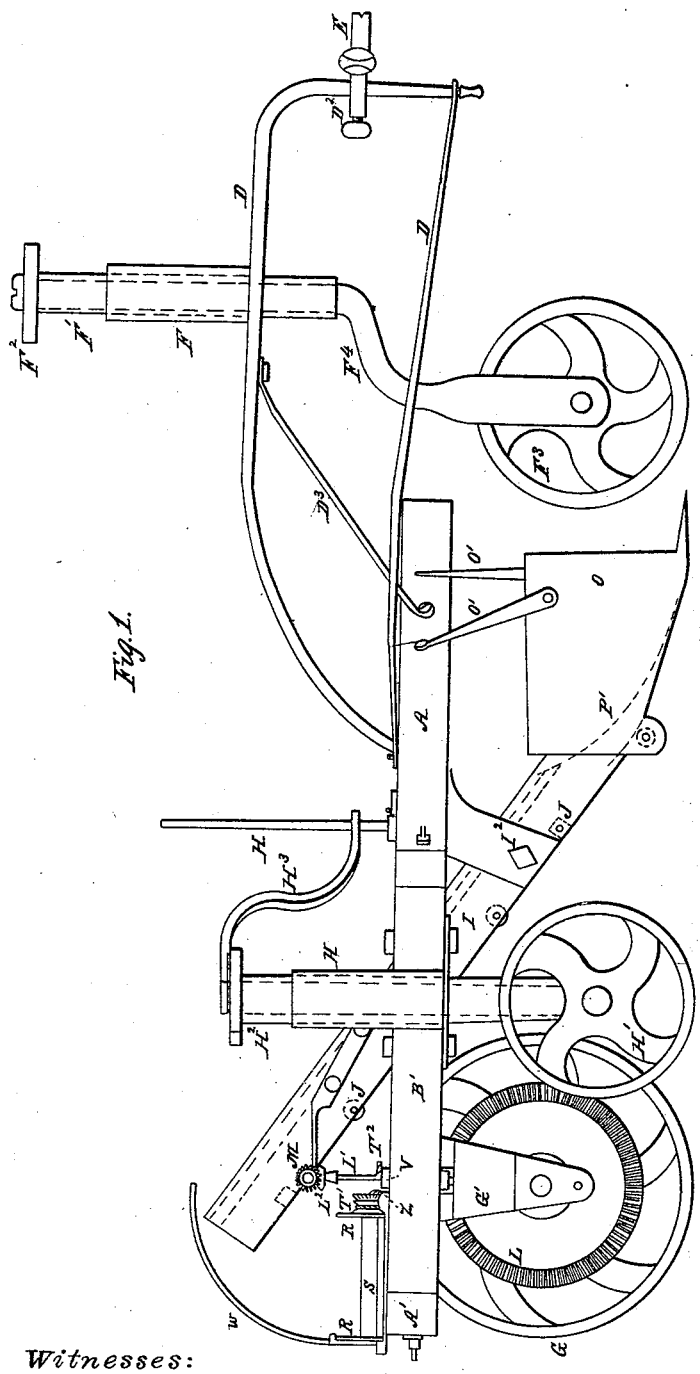

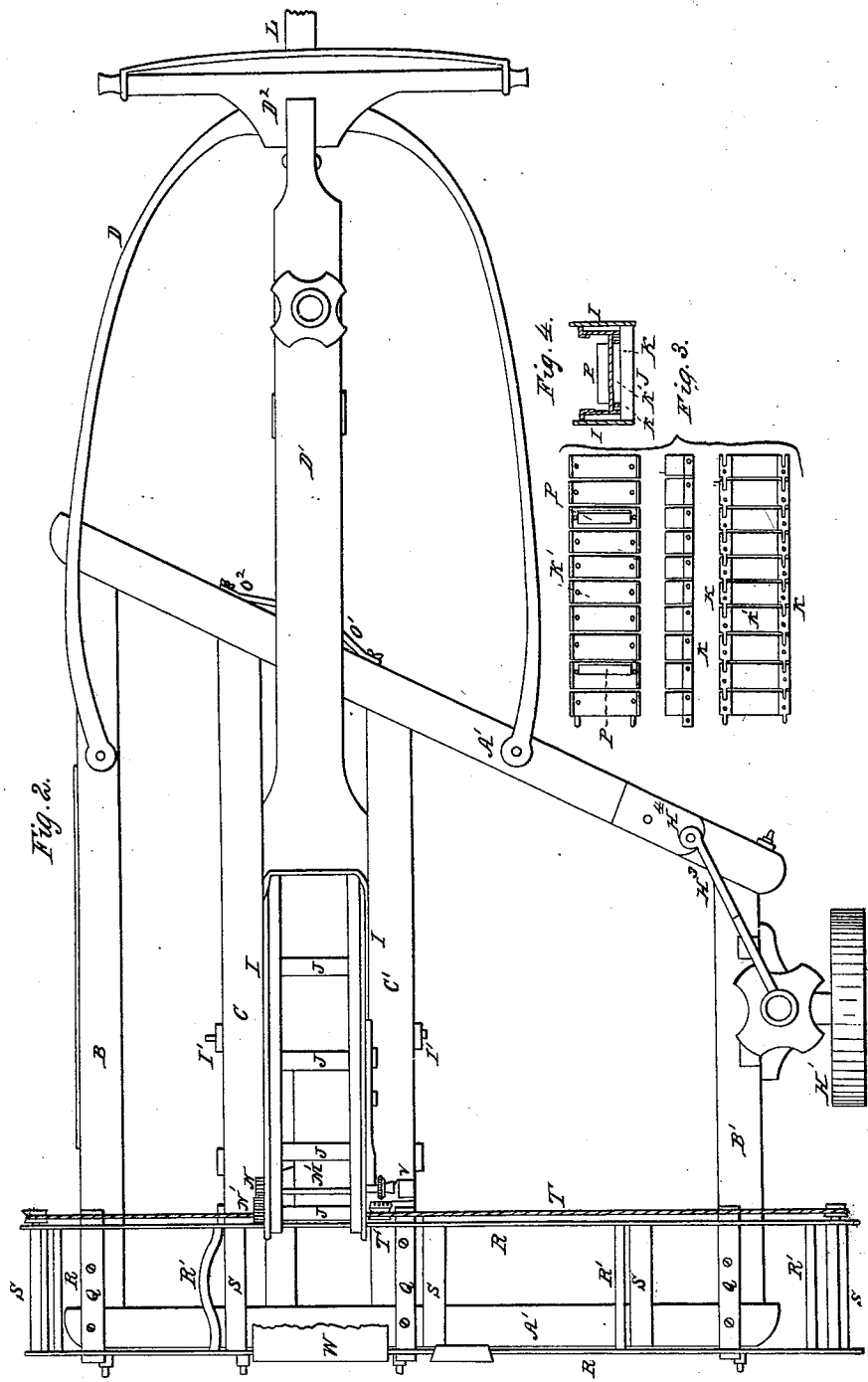

ISAAC HOSKINS AND JOSIAH HOSKINS, OF WILMINGTON, OHIO.

DITCHING AND GRADING MACHINE.

Specification of Letters Patent No. 25,899, dated October 25, 1859.

*To all whom it may concern:*

Be it known that we, ISAAC HOSKINS and JOSIAH HOSKINS, both of Wilmington, in the county of Clinton and State of Ohio, have invented certain new and useful Improvements in Ditching and Grading Machines; and we do hereby declare that the same are described and represented in the following specifications and drawings.

To enable others skilled in the art to make and use our improvements we will proceed to describe their construction and operation, referring to the drawings, in which the same letters indicate like parts in each of the figures.

Figure 1, is an elevation of one side. Fig. 2, is a plan of the same. Fig. 3, is a portion of the carrying belt. Fig. 4, is a section of the elevating trough.

The nature of our invention and improvements in ditching and grading machines, consist in an adjustable side wheel, so arranged as to raise and lower the side of the frame to suit the work being done. Also in a belt made of bars with projections or flanges at each end, arranged to travel under cleats on the sides of the frame or trough to prevent the earth from getting in between the ends of the bars and the sides of the trough.

In the accompanying drawings, A, is the front, and A', the rear bar of the frame, connected together by the side bars B, B', and the middle bars C, C', so as to form a strong frame to which the other parts of the machine are fastened or connected.

D, is a clevis bow fastened to the bars A, and B, and D', is a vertical bow or frame of iron made in the form shown in Fig. 1, with its rear end fastened to the sides of the elevating trough, and its front end is put through the drawbeam D² and fastened to the clevis D. This bow D', is stayed by the brace D³, to the bar A, as shown in the drawing. The draw beam may be set either higher or lower on the bow as may be required and the pole E, is hinged to it as shown in the drawings, by which the machine may be drawn when it is operated.

There is a long hub F, on the top of the bow D', containing a female screw to which the hollow screw F', is fitted, so as to be turned by the hand wheel F², to raise or lower the fore end of the machine to make the ditch shoal or deep as required. The pivot F⁴, of the fore or caster wheel F³, turns freely in the hallow screw F', and supports and carries the front end of the machine.

The axle of the wheel G, which supports and carries the rear end of the machine turns in stands fastened to the bars C, and C', one of which stands is shown at G', Fig. 1, of the drawings. There is a stand fastened to the side bar B', with a long hub H, on it containing a female screw to which the screw H², is fitted and provided with a hand wheel by which it may be turned to raise or lower the side of the machine as this screw H², is hollow and carried the standard of the side wheel H', in the same way that the screw F', carries the standard of the fore wheel F², except that the standard of the wheel H', is prevented from turning by the arm H³, which is fastened to its upper end, and arranged to traverse on the rod H⁴, fastened to the bar A, for that purpose.

I, I, are the side pieces of the elevating trough fastened to the bars C, C', by the bolts I', I', and to the end of the bow D', by bolts one of which is shown at I², Fig. 1. The sides I, I, are perforated for the pivots of the rollers J, J, which carry the apron or belt which elevates the earth from the ditch; the two end rollers are made square as shown by dotted lines in Fig. 1, to suit the length of the links of the chains K, which carry the bars K', which form the belt to carry the earth from the ditch. A top view, also a side elevation, and a view of the bottom of this belt, is shown in Fig. 3, of the drawings, and an end view or section of the trough, belt and rollers is shown in Fig. 4. The ends of the bars K', are turned up, and there are some cleats fastened to the sides I, I, which cleats project over and down, inside of the ends of the bars which are turned up, so as to prevent the earth from getting in between the ends of the bars and the sides I, I, and falling through into the ditch from whence it was taken. To traverse or run this belt the bevel wheel or gear L, is fastened to the wheel G, and acts on a pinion on the lower end of the upright shaft L', which turns in boxes fastened to the stand G' and to the side I, and has a gear L², on it which turns the gear M, and shaft M', in the sides I, I. The shaft M' has the gear N, on it to turn the gear N' on the end of the square shaft or roller J, to move and carry the belt of bars K'.

The lower ends of the bars I, I,—are armed with an iron scoop O, which is fastened to them and connected to the bar A' by the links O', O', so as to hold it firmly in a proper position to enter the ground and cut a ditch and the earth is pushed up onto the apron or belt, which carries it up and delivers it onto a cross belt, which will be described presently; and to prevent the earth from slipping on the belt—some of the bars have a flange P, on them, shown in Figs. 3, and 4, so as to make them sure to carry the earth from the ditch forward, or up as the belt traverses. There is a plate in the scoop O, shown by the dotted line P', Fig. 1, over which the earth passes as it is pushed up onto the belt.

There are three bars of metal Q, Q, with flanges on their ends fastened to the bars B, B', and C', as shown in Fig. 2, for the rails or bars R, R, to lie, and be traversed on, which rails are connected by the bars R', R', and are perforated for the pivots, of the rollers S, S, which are for a belt like that represented in Fig. 3, heretofore described; the two end rollers being made square and provided with pulleys S', S', for the rope or chain T, which turns them to operate the belt and carry the earth thrown onto it by the elevating belt, to one side of the ditch and throw it onto the ground. The rope T, is carried by the pulley T' turned by the gear fastened to it, which is turned by the gear $T^2$, on the upright shaft L', heretofore described. The stud on which the pulley T', turns is fastened into the stand V, which stand is fastened to the bar C'. The rope T, entirely surrounds the pulley T', so as to allow the bars R, R, to be moved, and placed so that the belt will deposit the earth, at such a distance from the ditch, as may be required, to grade a road or street, or form an embankment by the side of the ditch cut. To prevent the elevating belt from throwing the earth beyond the cross belt, we have arranged the curved plate W, opposite the elevating belt and fastened it to the bar A'.

To use this machine we propose to draw it in the same track as many times as may be necessary, to make the ditch the depth required, and to hitch the animals that draw it, so far apart that they can travel each side of the ditch. Our machine is peculiarly adapted to grading roads and streets, as the cross belt may be set so as to deposit the earth at different distances from the ditch, each time the machine is drawn along. It is also well adapted to make ditches and embankments for fencing or dividing land, and for making ditches to lay drains as after the drains are laid the machine may be operated so as to return the earth to the ditch from whence it was taken. By changing the rope on the pulley T', the belt may be run either way so as to deposit the earth either side of the machine.

We believe we have described and represented our improvements, so as to enable any person skilled in the art to make and use it.

We will now state what we desire to secure by Letters Patent, to wit.

1. We claim making the side wheel adjustable so as to raise and lower the side of the frame, to level or adjust it as desired.

2. We claim a belt made of bars with projections or flanges at each end, arranged to travel under cleats on the sides of the frame or trough substantially as described.

ISAAC HOSKINS.
JOSIAH HOSKINS.

Witnesses:
A. H. CHAPMAN,
ELI HODSON.